United States Patent [19]

Gawain et al.

[11] 4,339,678
[45] Jul. 13, 1982

[54] MULTISTAGED ELECTROHYDRODYNAMIC (EHD) GENERATOR WITH PARALLEL OUTPUTS

[75] Inventors: Theodore H. Gawain; Oscar Biblarz, both of Carmel, Calif.

[73] Assignee: The United States of America as represented by the Secretary of the Navy, Washington, D.C.

[21] Appl. No.: 179,202

[22] Filed: Aug. 18, 1980

[51] Int. Cl.³ .............................................. H02K 44/00
[52] U.S. Cl. ....................................................... 310/10
[58] Field of Search .......................... 310/300, 307–309, 310/10, 11

[56] References Cited

U.S. PATENT DOCUMENTS 3,569,751  3/1971  Ruhuke ................................. 310/10
3,723,777  3/1973  Musgrove ........................ 310/10 X

*Primary Examiner*—Donovan F. Duggan
*Attorney, Agent, or Firm*—R. S. Sciascia; Charles D. B. Curry; William C. Daubenspeck

[57] ABSTRACT

A multistage EHD generator with parallel outputs to produce a usable output current. A single injector injects particles or droplets into a fluid flow which traverses a plurality of EHD generator stages in series. At each generator stage there is a means for charging the particles and a means for neutralizing the particles. The outputs between the charging and neutralizing means are connected in parallel to provide a substantial electrical power output.

1 Claim, 2 Drawing Figures

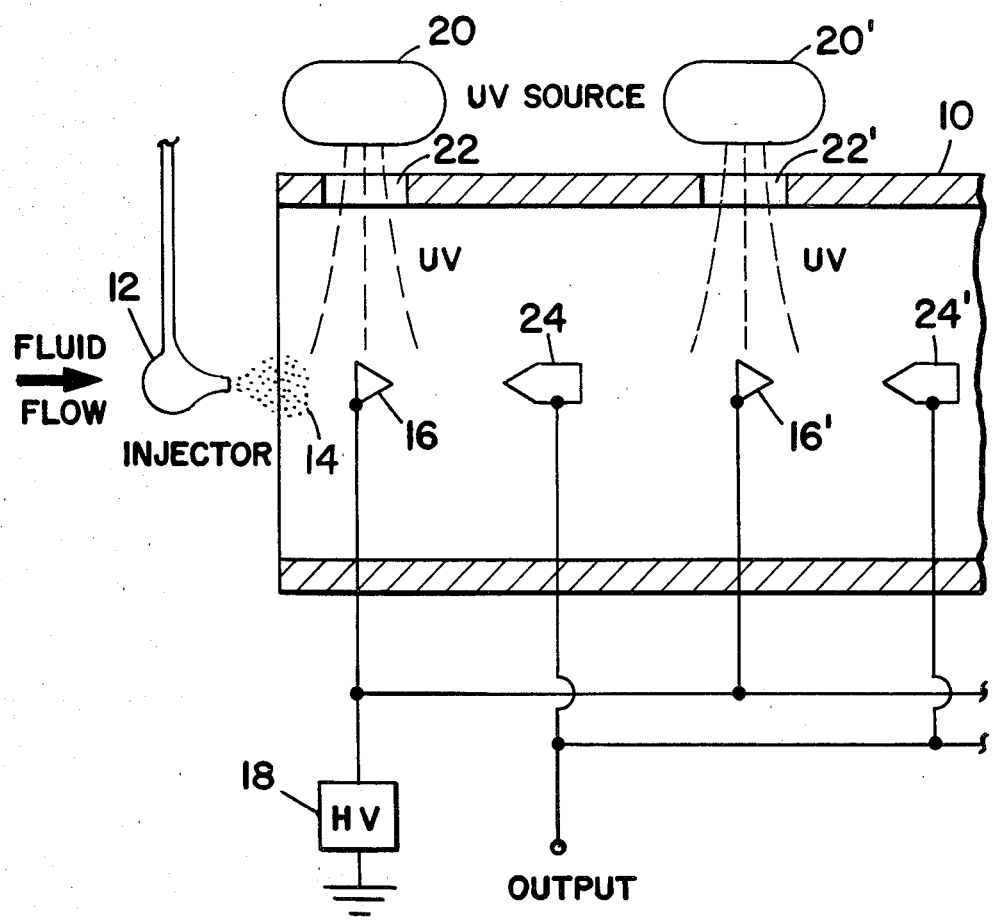
FIG _ 1
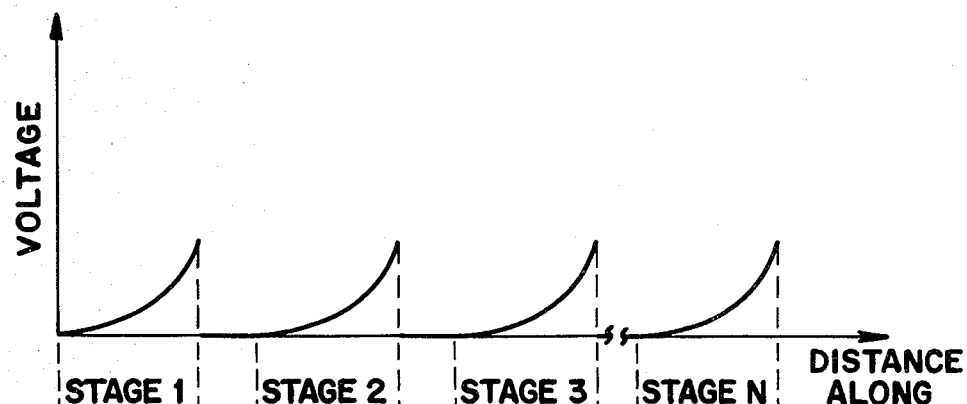
FIG _ 2

MULTISTAGED ELECTROHYDRODYNAMIC (EHD) GENERATOR WITH PARALLEL OUTPUTS

BACKGROUND OF THE INVENTION

1. Field of the Invention

The present invention relates to electrohydrodynamic (EHD) generators, and more particularly to a multistage EHD generator having parallel outputs.

2. Background of the Invention

An EHD generator has an injector which injects unipolar particles or droplets into a fluid flow. These particles or droplets are ionized by a suitable charging mechanism such as corona discharge, as described in U.S. Pat. No. 3,777,564 issued Dec. 11, 1973 to Oscar Biblarz, entitled "Electrogasdynamic Spectral Anemometer", or ultra-violet (UV) radiation. The fluid flow carrying these charged particles passes through a channel and a collector neutralizes the charge, producing an electric current. The amount of power produced by a simple EHD generator is on the order of 50 watts. This is too small for practical power applications, therefore, various staging techniques have been used to increase the usable power output. One technique has been to use a single injector for a plurality of simple EHD generators in parallel. Another technique has been to use multiple EHD generators connected in series with a separate injector and particle collector for each stage. The disadvantage of the first technique is the low pressure drop across the working fluid. The disadvantage of the second technique is the requirement for multiple particle injectors and collectors.

SUMMARY OF THE INVENTION

Accordingly, the present invention provides a multistage EHD generator with parallel outputs to produce a usable output current. A single injector injects particles or droplets into a fluid flow which traverses a plurality of EHD generator stages in series. At each generator stage there is a means for charging the particles and a means for neutralizing the particles. The outputs between the charging and neutralizing means are connected in parallel to provide a substantial electrical power output.

Therefore, it is an object of the present invention to provide a multistage EHD generator to obtain a significant electrical power output.

Another object of the present invention is to provide a multistage EHD generator having a relatively simple configuration.

Other objects, novel features and advantages of the present invention will be apparent from the following detailed description when read in conjunction with the appended claims and attached drawing.

BRIEF DESCRIPTION OF THE DRAWING

FIG. 1 is a schematic view of a multistage EHD generator according to the present invention.

FIG. 2 is a diagrammatic view of the output voltage along the length of the EHD duct.

DESCRIPTION OF THE PREFERRED EMBODIMENT

Referring now to FIG. 1 a fluid flow through a single channel 10 is shown. An injector 12 injects particles or droplets 14 into the fluid flow in which they are entrained. As the fluid flow passes through the first stage of the multistage EHD generator the particles are charged, as described in co-pending patent application serial number 06/093,790 filed on Nov. 13, 1979 by Oscar Biblarz entitled "Charging Mechanisms for Electrogasdynamic Spectral Anemometer", by a rod 16 charged by a high voltage source 18 and irradiated by an ultraviolet source 20 via window 22 in the wall of the channel 10. A collector 24 downstream from the rod 16 neutralizes the charged particles and transmits a resulting electric current to the output. The particles 14 continue to be entrained in the fluid flow and are again charged and neutralized in the second stage by a rod 16' and ultraviolet source 20' and by a collector 24'. Likewise, for all subsequent stages the particles 14 are charged and discharged to produce a current output at each stage. The current outputs from each stage are connected together in parallel to produce a power output which is $P=(V)\times(nI)$ where V is the voltage per stage, n is the number of stages and I is the current per stage. At the end of the channel 10 the particles, which are between $10^{-7}$ and $10^{-6}$ m in size, may be collected and transferred back to the injector 12 for reinsertion into the fluid flow by conventional means, or they may be discarded.

The voltage level along the EHD duct 10 is shown in FIG. 2. Typical voltage and current levels for the multistage EHD generator are 50 Kv and 1 ma per stage, or 100 ma for 100 stages. Thus, a power level of 5 Kw is feasible from systems which operate not too much above ambient pressure.

The optimum number of stages is dependent upon the electrical and fluid dynamic losses. This optimum is approximately on the order of 100 stages.

Thus, the present invention provides a multistage EHD generator having a plurality of single EHD generators connected in series with the outputs connected in parallel to produce a significant electrical power output. The particles are injected into the fluid flow at the input to the first stage and remain entrained through all stages, being charged and discharged at each stage. Fluid dynamic losses are minimized by using a constant area, straight duct and by designing the electrodes for minimum blockage.

What is claimed is:

1. A multistage electrohydrodynamic (EHD) generator comprising:
   (a) a plurality of EHD generator stages connected in series, said plurality of stages being formed in a single straight channel, each of said EHD stages having a means for charging and a means for discharging particles entrained in the fluid flow in said channel;
   (b) a single particle injector at the input to the first of said plurality of EHD generator stages for injecting said particles into the fluid flow; and
   (c) means for additively collecting the current output from each of said plurality of EHD generator stages such that the total output power, P, is equal to the voltage per each stage, V, times the current per each stage, I, times the number of stages, n.

* * * * *